United States Patent
Schoen et al.

(10) Patent No.: US 6,635,093 B1
(45) Date of Patent: Oct. 21, 2003

(54) METHOD OF MAKING PELLETIZED FUEL

(75) Inventors: Löwhardt A. A. Schoen, Spaubeek (NL); Anton R. Christoffel, Geulle (NL)

(73) Assignee: DSM N.V., Heerlen (NL)

( * ) Notice: Subject to any disclaimer, the term of this patent is extended or adjusted under 35 U.S.C. 154(b) by 210 days.

(21) Appl. No.: 09/658,504

(22) Filed: Sep. 8, 2000

(30) Foreign Application Priority Data

Sep. 9, 1999 (NL) .............................................. 1013007

(51) Int. Cl.$^7$ ................................................. C10L 5/00
(52) U.S. Cl. ............................ 44/553; 44/589; 44/590; 44/597
(58) Field of Search ........................ 44/553, 589, 590, 44/596, 597

(56) References Cited

U.S. PATENT DOCUMENTS

| | | | |
|---|---|---|---|
| 1,716,490 A | * 6/1929 | Glaze et al. ................. 264/124 |
| 3,060,511 A | 10/1962 | Parmella | |
| 4,211,740 A | 7/1980 | Dean et al. | |
| 4,529,407 A | * 7/1985 | Johnston et al. .............. 44/542 |
| 4,952,216 A | 8/1990 | Good | |
| 5,342,418 A | 8/1994 | Jesse | |
| 5,643,342 A | 7/1997 | Andrews | |
| 5,882,365 A | * 3/1999 | Farjon et al. .................. 44/535 |
| 5,980,595 A | * 11/1999 | Andrews ...................... 44/530 |

FOREIGN PATENT DOCUMENTS

GB 2118966 11/1983

* cited by examiner

*Primary Examiner*—Cephia D. Toomer
(74) *Attorney, Agent, or Firm*—Pillsbury Winthrop LLP

(57) ABSTRACT

The invention relates to a method of making pelletized fuel containing plastic and cellulose particles in which a feed stream containing plastic and cellulose particles is supplied to a pelletizing device.

The process is used in particular in processes for recycling household and industrial waste streams into pelletized fuel. The invention also relates to pelletized fuel, to the use of the pelletized fuel as secondary fuel and to various methods of firing furnaces with the pelletized fuel. The process according to the invention is characterized in that the feed stream contains at least 40 wt. % plastic and the pelletizing device has an annular mould with holes whose effective hole length (L) and hole diameter (D) ratio (R) is at least 5. Besides a high calorific value, the pelletized fuel obtained has a good hardness, good bulk, storage and transport properties and a good grindability.

12 Claims, No Drawings

METHOD OF MAKING PELLETIZED FUEL

The invention relates to a method of making pelletized fuel containing plastic and cellulose particles in which a feed stream containing plastic and cellulose particles is supplied to a pelletizing device.

The method is used in particular in processes for recycling household and industrial waste streams into pelletized fuel. Cellulose particles originate from for example paper, wood, nappies, bandages and textile. Plastic particles originate from for example packaging materials, in particular polyethylene film. Such pelletized fuel recyclate has a high heat of combustion and is used as fuel in furnaces. The invention also relates to pelletized fuel, to the use of the pelletized fuel as secondary fuel and to different methods of firing furnaces with the pelletized fuel.

The commercially available pelletized fuel recyclate has hitherto been used virtually exclusively under non-critical combustion conditions, as in fluid-bed furnaces. Because of the long residence times in such incineration furnaces, fewer requirements are imposed with respect to the properties of the pelletized fuel and the methods of making it. The known pellets are virtually not used as secondary fuel under more critical combustion conditions, as for example in blast-furnaces and power-station furnaces fired with pulverized coal. As a result, the potential demand for pelletized fuel recyclate lags far behind the tremendous potential supply. This is very disadvantageous because a very large amount of polluting waste must be dumped or processed at high costs while a huge source of energy remains untapped.

U.S. Pat. No. 5,342,418 describes a method of making pelletized fuel from household waste, in particular from nappies and sanitary napkins, for use as secondary fuel in a mixture of coal for firing furnaces. The plastic content of the pellets is to this end chosen to lie between 10 and 40 wt. %. The properties of the pelletized fuel, such as the dimensions, the composition and the density, have been chosen in the light of its use as secondary fuel in a mixture containing the coal as the primary fuel. These pellets are produced by using a shredder and a hammer mill to reduce the particle size in a waste stream consisting of plastic and cellulose particles and supplying the feed stream obtained to a pelletizing device. It is described that the pellets obtained are lightly bound and break easily and that harder pellets can be obtained by reducing the plastic content and increasing the moisture content. According to U.S. Pat. No. 5,342,418, a higher plastic content implies an even lower hardness, as a result of which the pellets will break even more easily. It is also mentioned that higher plastic contents of up to 60 wt. % are actually possible, but that such pelletized fuel is not suitable for use as secondary fuel for coal and has to be burned in special pellet incinerators. The plastic content and the cellulose content are here and hereinafter each time expressed in percentages of the total dry weight of the plastic and the cellulose. Where here and hereinafter reference is made to properties of the fuel pellet or of particles in a collection of particles, this is intended to imply the average value of a sufficiently large number of pelletized fuel or particles. "Feed stream" is here and hereinafter each time understood to be the stream that is fed to the pelletizing device.

There is now a need for a process for a method of making pelletized fuel that has a high plastic content while nevertheless it has sufficiently good properties to enable its use as secondary fuel. Besides a high calorific value, "good properties" are in particular understood to imply a good hardness, which lends the pellet good bulk, storage and transport properties, such as in particular better pneumatic dosing properties, less pellet fracture, less particle size segregation, a higher density and better flow behaviour. Another important desired property is good grindability. The aim of the invention is to meet this need.

This aim is achieved according to the invention because the feed stream contains at least 40 wt. % plastic (relative to the total dry weight of the plastic and the cellulose fibres) and the pelletizing device has an annular mould with holes whose effective hole length (L) and hole diameter (D) ratio (R) is at least 5. The 'hole diameter' is in each case understood to be the smallest diameter of the hole, which determines the diameter of the pellet. 'Effective hole length (L)' is understood to be the length of the part of the hole in which the feed stream is effectively compressed.

It has surprisingly been found that it is possible to produce pelletized fuel with a high plastic content that is suitable for use as secondary fuel using a pelletizing technique in the method according to the invention. This is particularly surprising because pellets with such high plastic contents can usually be made only with the aid of extruders or agglomerator machines, be it for different purposes. This is a major advantage for the waste-processing industry because pelletizing is a very cheap forming technique in comparison with extrusion or agglomeration. Preferably, the plastic content is then even higher, preferably at least 50%, more preferably at least 60 and most preferably even at least 75 wt. %. It has been found that the pelletized fuel obtained with this process combines the advantages of a very high calorific value, good combustion properties and a good hardness and grindability.

Preferably, the plastic in the process according to the invention consists substantially of polyethylene. The plastic in most waste streams comes predominantly from packaging materials made predominantly of polyethylene. 'Polyethylene' is here also understood to include all polymers principally containing ethylene as the monomer, such as linear, branched homopolymers or copolymers of ethylene. In addition to polyethylene, the feed stream may contain a minor amount of at most about 30, more preferably at most 20, wt. % one or more other plastics. The processing conditions mentioned below are based on polyethylene as the chief component. The method according to the invention can in principle however be similarly applied to feed streams that contain principally plastics other than polyethylene, with the understanding that the processing conditions to be mentioned below must be adjusted accordingly. In particular, the temperatures are adjusted by an amount that corresponds approximately to the difference in the softening temperature of the plastic in the feed stream. A person skilled in the art can simply determine the optimum value on the basis of the description.

In the method according to the invention the feed stream preferably has a temperature (T1) of at most 90° C., more preferably at most 75° C. At this temperature the feed stream has sufficiently good transport properties without involving problems of agglomeration, smearing and filament formation before or in the pelletizing device. 'Smearing' is understood to mean that the high temperature causes the plastic to soften, melt or at least become fluid to such an extent that it is smeared over and adheres to all parts with which it comes into contact. In the context of these objectives the temperature is preferably at most 60° C. and most preferably at most 50° C. Preferably, the feed stream is heated to the aforementioned temperature in a drying step before the pelletizing step. If the plastic content of the feed stream is at least 60 wt. %, the feed stream preferably has a temperature (T1)

of at most 75, more preferably at most 60° C., for the purpose of preventing agglomeration and smearing.

In view of the stability of the pelletizing process and the quality of the pelletized fuel obtained, the values of R and T1 are preferably chosen in relation to one another so that the temperature (T2) of the pellets leaving the annular mould is between 80 and 125° C. Preferably, temperature T2 is above 90° C. because then a good pellet hardness is obtained. Preferably, the temperature is generally lower than 125° C., preferably lower than 120° C. and even more preferably lower than 115° C. because the pellets leaving the mould will then agglomerate less. The higher the plastic content, the greater the tendency to agglomerate will be. Therefore, at a plastic content of more than 60 wt. % the values of R and T1 are chosen in relation to one another so that the temperature (T2) of the pellets leaving the annular mould is between 80 and 110° C. The rise in temperature (T2–T1) that occurs in the pelletizing device is, with a view to obtaining a good hardness, preferably at least 10, more preferably at least 20, even more preferably at least 30 and most preferably at least 40° C. A greater rise in temperature can for example be chosen by setting a higher R. This will result in a more compact and harder fuel pellet. For this reason R is preferably at least 8, more preferably at least 10, even more preferably at least 12 and most preferably at least 15. The value of R that is chosen cannot be any high value as that would adversely affect the productivity. The value of R is therefore generally less than 20. Higher rises in temperature can also be realized by choosing a heated or heat-insulated annular mould.

Preferably, the diameter of the holes in the annular mould is at most 10 mm. The advantage of this is that harder pellets are then obtained. The R ratio must then be greater than 5, as described above. In view of the desired high hardness the diameter is preferably at most 8, more preferably at most 6 and most preferably at most 4 mm. A possible explanation for this is that the generated heat also penetrates into the interior of the pellet more quickly, resulting in a better adhesion between the softened plastic particles and the cellulose particles in the interior of the pellet, too. The pellet's length is generally chosen to be between 1 and 10, preferably between 1 and 5 and more preferably 1 to 3 times the diameter. Most preferably, the lengths is approximately the same as the diameter. The (average) length can for example be chosen by cutting or breaking the pellets leaving the annular mould with the aid of one or more knives or breaking bars moving relative to the mould surface.

In the method according to the invention the feed stream is preferably produced from a waste stream through reduction thereof in a reducing device containing a screen mat and a grinding device, which screen mat, as a result of a frequently varying tensile load working on it, shakes the waste stream loose, during and/or after which it is separated on the basis of size into a fraction of small particles and a fraction of large particles, after which the large particles fraction is reduced to a ground product having the desired particle size in the grinding device and after which the ground product and the small particles fraction are combined. The intensive shaking on the screen mat causes small agglomerated particles to break up, as a result of which a relatively large fraction can already comply with the desired maximum dimensions. This involves a major capacity advantage. Preferably, at least 20–30 wt. % of the waste stream is already smaller than the mesh size of the screen mat. Another advantage of this method is that heavy parts such as metal parts can be well separated from light particles, such as the cellulose and plastic particles, as a result of which they can more easily, more completely and more selectively be removed from the waste stream before the large particles fraction is supplied to the grinding device. Preferably, the metal parts are removed by a magnet, preferably a belt magnet, during and/or after the shaking on the screen mat. The capacity will depend on the desired degree of reduction and hence on the difference in particle size between the waste stream and the feed stream. A 'grinding device' is in particular understood to be a shredder, although the method is in principle not limited thereto. It should be noted that the aforementioned method for reducing the waste stream can be used not only in the method according to the invention, but also in general, in the aforementioned preferred embodiments and with the aforementioned advantages, to reduce a waste stream containing plastic and cellulose particles.

The size of the sieve meshes, and hence of the particles after the grinding, is chosen in relation to the hole diameter of the annular mould. With a view to obtaining a well pelletizable feed stream the size of the plastic and cellulose particles in the stream fed to the pelletizing device is preferably predominantly at most 6 times, more preferably at most 5 times and most preferably at most 4 times the hole diameter of the annular mould in the subsequent pelletizing step. 'Predominantly is here understood to imply at least about 75 wt. %. If the particles are too large, the residence time of the material in the pelletizing device becomes too long, as a result of which the temperature may become too high and smearing of the plastic particles may occur. It has been found that good pelletizing results can be obtained for pelletized fuel with diameters of between 5 and 10 mm if the particles in the feed stream are predominantly smaller than 30 mm. With a particle size in the feed stream of 30 mm or more it is difficult to obtain fuel pellets with diameters of less than 5 mm in a pelletizing step.

As the waste stream usually has a high moisture content, the waste stream's recycling process usually comprises one or more drying steps. The moisture content plays an important part in pelletizing the feed stream. Moisture contents are expressed in percentages of the total weight, whereas the plastic or cellulose contents are expressed in percentages of the dry weight of the plastic and cellulose particles. Preferably, the feed stream in the method according to the invention has a moisture content of 1 to 15 wt. % (relative to the feed stream's total weight). Preferably, the moisture content is 2–10 wt. % and more preferably 3–5 wt. %. The advantage of a certain minimum amount of water is that the feed stream can be more easily deformed, and hence more easily pelletized. If the plastic content is higher than 60 wt. % the feed stream's moisture content may be lower, in particular between 1 and 5 or even between 1 and 3 wt. %, this having the advantage that the end product will contain less moisture and have an even higher calorific value. Another advantage of the presence of a minimum amount of moisture is that the pellets leaving the mould holes will cool faster and further due to the evaporation of moisture still present, as a result of which agglomeration will less readily take place. In the method according to the invention the pellets leaving the annular mould therefore preferably have a moisture content of between 2 and 5 wt. %, after which the pellets are cooled and dried in a gas stream. The feed stream's moisture content is also a control parameter for the temperature of the feed stream and the temperature of the pellets leaving the mould. Preferably, this content is therefore chosen to be such that the temperature of the pellets leaving the mould holes is not higher than 125° C. for reasons and with the specific preferences described above.

The moisture content may on the other hand not be chosen to be so high that the residual moisture content after the production of the fuel pellet is too high because the moisture substantially reduces the fuel pellet's calorific value on account of the high heat of evaporation. For these reasons the moisture content of the ultimate fuel pellet is preferably less than 5, more preferably even less than 3 wt. %.

To summarize, the most suitable embodiment of the method of making pelletized fuel according to the invention relates to a method in which a feed stream which contains at least 40 wt. % plastic particles, substantially polyethylene particles, cellulose particles and at most 15 wt. % moisture, is at a temperature (T1) of at most 90° C. supplied to a pelletizing device containing an annular mould with holes with a hole diameter of at most 10 mm and with an effective hole length and hole diameter ratio (R) of at least 5, the values of R and T1 being chosen in relation to one another so that the temperature (T2) of the pellets leaving the annular mould is between 80 and 125° C. and the T2–T1 rise in temperature is at least 10° C.

In a special embodiment of the method according to the invention the pelletizing is carried out in two successive steps, the hole diameter of the annular mould being smaller in the second pelletizing step than in the first pelletizing step. With a view to obtaining a higher total capacity, R is in the first step preferably smaller than in the second step. The advantage of this method is that it is very suitable for producing pellets with very small diameters. The two-step pelletizing process is preferably used for a desired pellet diameter of less than 8 mm, more preferably for a pellet diameter of less than 5 mm and even more preferably for a pellet diameter of less than 4 mm. It is very surprising that such small pellets can be produced with the aid of a pelletizing technique without any risk of too long a residence time and smearing of the plastic particles in the pelletizing step. The aforementioned two-step pelletizing is preferably used if the particle size in the feed stream is greater than about 4, preferably 5, more preferably 6, times the diameter of the ultimate fuel pellet. It should be noted that the aforementioned method of making pellets is essentially not restricted to the production of said pelletized fuel. This invention relates in general to the forming of pellets with diameters of less than 10 mm, preferably less than 8, and more preferably less than 5 mm, from a stream of particles containing solid particles and preferably at least 40 wt. % plastic particles, with two pelletizing steps being carried out in series, the hole diameter of the annular mould being smaller in the second pelletizing step than in the first pelletizing step.

The invention also relates to pelletized fuel that can be obtained according to the methods according to the invention described above. In particular, the invention relates to a fuel pellet containing cellulose particles and at least 40 wt. % plastic particles (relative to the total weight of the plastic and the cellulose fibres) which pellet has a hardness of at least 10 kgf (measured according to the Kahl test). Preferably, the fuel pellet according to the invention then has a diameter of at most 10 mm. These pellets are very suitable for use as secondary fuel. If the fuel pellet has a plastic content of above 60 wt. %, the hardness is preferably at least 15 kgf. In general, the hardness is preferably more than 20, more preferably more than 25 and most preferably more than 30 kgf. The pellets have good burning properties, such as in particular a very high calorific value, and good bulk, storage and transport properties, such as in particular good pneumatic dosing properties, little dust formation, fracturing and particle size segregation, good flow behaviour and good grindability. 'Pneumatic dosage' is understood to be the injection of the pellets into the furnace via transport effected with a gas stream (stream of air). The pellets also have a lower hygroscopicity, as a result of which the long-term stability may also be better. The absorption of moisture, and hence the ultimate moisture content, will consequently also be less, which is advantageous because moisture reduces the pellet's calorific value. The pellets therefore have a relatively high heat of combustion. This will be more than 20, preferably more than 25, even more preferably more than 30 and most preferably even more than 35 GigaJoules per tonne, depending in part also on the plastic content. The pelletized fuel according to the invention is particularly suitable for use as fuel, in particular as secondary fuel in addition to a primary fuel, for firing furnaces.

The invention hence also relates to the use of the pelletized fuel according to the invention as secondary fuel in addition to a primary fuel. In particular, the invention relates to a method of firing a furnace with a primary fuel and a secondary fuel, preferably the pelletized fuel according to the invention, in which the secondary fuel is supplied to the flame of the primary fuel separately from the primary fuel. On account of its good properties, the pelletized fuel according to the invention is particularly suitable for combustion in furnaces to which the primary fuel and the secondary fuel are supplied separately, the secondary fuel being supplied to the flame of the primary fuel. This method presents the advantage, for example over the combustion of a mixture of the primary fuel and the secondary fuel, that less solid substance segregation, dust formation and also incomplete combustion take place. The pelletized fuel may be supplied either in ground or in unground form.

The pelletized fuel is also particularly suitable for use in blast-furnaces and power-station furnaces fired with pulverized coal in which pelletized fuel obtained from recycled waste streams has hitherto been used with great problems only. Research has shown that the known pelletized fuel is not suitable for use in power-station furnaces fired with pulverized coal, partly on account of pneumatic dosing problems (poor flow behaviour) and because it is on the one hand too large for direct use and on the other cannot be well ground, which may lead to blockage of the dosing system (injection system) and incomplete combustion and contamination of the bottom ash. It has been found that the pelletized fuel according to the invention with a hardness of more than 10 Kgf or, if the pellet has a plastic content of more than 60 wt. %, more than 15 Kgf, is particularly suitable for this application because of its very good grindability. The invention therefore also relates to a method of firing a furnace with pulverized coal as the primary fuel, with pelletized fuel according to the invention with a hardness of more than 10 Kgf or, if the pellet has a plastic content of more than 60 wt. %, more than 15 Kgf, being ground and the ground product being supplied to the flame of the primary fuel in the furnace. In view of the grindability, the hardness is preferably at least 20 Kgf. Preferably, in this method the ground product is supplied directly to the furnace immediately after grinding. The advantages of this are that any transport problems attributable to compacting of the ground product are avoided and that the safety risk of dust explosions occurring is reduced. Preferably, the pelletized fuel is ground so that at least 80 wt. % of the ground product is smaller than 2 mm. The advantage of this is that combustion is complete. It has been found that very good grinding results are obtained when an ultrarotor is used as the grinding device, especially at high plastic contents, for example of above about 60 wt. %.

Research has also shown that the commonly obtainable pelletized fuel is unsuitable for use in blast-furnaces. In blast-furnaces there is a high pressure of about 5 bar and all the transport takes place in closed systems. When a secondary fuel is used the storage and supply of the secondary fuel are under pressure and injection lances are used to supply it. These conditions make it very difficult to use secondary fuel. Blockages were found to occur frequently during transport through the injection systems in the case of both pellets and ground product. In the case of ground product, problems arise in storage, too, as a result of bridge formation. There was therefore a need for an improved method of firing a blast-furnace using a recyclate as a secondary fuel in addition to the primary fuel. It has been found that very good results are obtained when the pelletized fuel according to the invention is then supplied directly to the blast-furnace as secondary fuel. Preferably, the diameter of the pelletized fuel is then less than about 5 mm, more preferably even less than 4 mm, to obtain good flow properties and complete combustion.

In view of its production costs, the diameter of the fuel pellet is preferably more than 2 mm, more preferably more than 3 mm. The length is preferably about 0.5–5 and most preferably 1–2 the same of the diameter. In view of the pneumatic transport properties, the length is most preferably approximately the same as the diameter. On account of its particular suitability for use as secondary fuel in blast-furnaces, the invention also relates to pelletized fuel according to the invention with a diameter of less than 5 mm and its use in blast-furnaces.

Some important advantages of the aforementioned method of firing blast-furnaces can generally also be obtained with pelletized fuel with a diameter of at most 5 mm even if it has not been made according to the method according to the invention. The pelletized fuel according to the invention is, however, preferred because it has a good hardness and causes little dust formation and blockages in the injection system.

What is claimed is:

1. Method of making pelletized fuel comprising supplying a feed stream at a temperature (T1) of at most 90° C., which feed stream contains at least 40 wt. % plastic particles, cellulose particles and up to 15 total wt. % moisture to a pelletizing device containing an annular mold with holes with a hole diameter of at most 10 mm and with an effective hole length and hole diameter ratio (R) of at least 5, and choosing the values of R and T1 in relation to one another so that the temperature T2 of the pellets leaving the annular mold is between 80 and 125° C. and the T2–T1 rise in temperature is at least 10° C.

2. Method of making pelletized fuel, which comprises supplying a feed stream containing plastic and cellulose particles, wherein the amount of plastic is at least 40 wt%. relative to the total weight of the plastic and cellulose particles to a pelletizing device having an annular mold with holes whose effective hole length (L) and hole diameter (D) is such that the ratio L/D is at least 5, and carrying out the pelletizing in two successive steps, the hole diameter of the annular mold being smaller in the second pelletizing step than in the first pelletizing step.

3. Method according to claim 2, wherein the hole diameter of the annular mold in the second pelletizing step is at most 5 mm.

4. Method of making pelletized fuel according to claim 1, wherein the plastic particles comprise ethylene polymer.

5. Method of making pelletized fuel according to claim 4, wherein the plastic particles comprise at least about 70 wt% ethylene polymer.

6. Method of making pelletized fuel according to claim 1, wherein the plastic content of the feed stream is at least 60 wt%, and the feed stream has a temperature (T1) of at most 75° C.

7. Method of making pelletized fuel comprising supplying a feed stream comprising plastic particles and cellulose particles, wherein the amount of plastic particles is at least 40 wt%, relative to the total weight of the plastic particles and cellulose particles, to a pelletizing device having an annular mold with holes whose effective hole length (L) and hole diameter (D) is such that the ratio L/D is at least 5, wherein the values of R and T1, where R represents the ratio L/D and T1 represents the temperature of the feed stream, are chosen in relation to one another so that the temperature T2 of the pellets leaving the annular mold is between 80 and 125° C. and the rise in temperature, T2–T1, is at least 10° C.

8. Method of making pelletized fuel according to claim 7, wherein the feed stream is produced from a waste stream through reduction thereof in a reducing device containing a screen mat and a grinding device, said screen mat shaking the waste stream loose as a result of a frequently varying tensile load working on it, during and/or after which it is separated on the basis of size into a first fraction of particles and a second fraction of particles, wherein the particles of the first fraction are smaller in size than the particles of the second fraction, after which the large particles fraction is reduced to a ground product having the desired particle size in the grinding device, after which the ground product and the small particles fraction are combined.

9. Method of making pelletized fuel according to claim 7, wherein the size of the plastic and cellulose particles in the stream fed to the pelletizing device is predominantly smaller than 6 times the hole diameter of the annular mold.

10. Method of making pelletized fuel according to claim 7, wherein the plastic particles comprise ethylene polymer.

11. Method of making pelletized fuel according to claim 10, wherein the plastic particles comprise at least 70 wt% ethylene polymer.

12. Method of making pelletized fuel according to claim 7, wherein the plastic content of the feed stream is at least 60 wt%, and the feed stream has a temperature (T1) of at most 75° C.

* * * * *